July 4, 1967

J. C. OVERBAUGH 3,329,394

LOCKABLE VALVE HANDLE

Filed Dec. 9, 1964

INVENTOR.
JOSEPH C. OVERBAUGH

BY
*Head & Johnson*

ATTORNEYS

INVENTOR.
JOSEPH C. OVERBAUGH
BY
ATTORNEYS

3,329,394
LOCKABLE VALVE HANDLE
Joseph C. Overbaugh, Houston, Tex., assignor to The Hale Company, Tulsa, Okla., a corporation of Ohio, a wholly owned subsidiary of The Lunkenheimer Company, a Delaware corporation
Filed Dec. 9, 1964, Ser. No. 417,169
4 Claims. (Cl. 251—99)

This invention relates to a handle for positioning a rotatable shaft. More particularly, the invention relates to a handle for positioning a valve stem. Still more particularly, the invention relates to a valve handle for positioning the disc of a butterfly type valve.

The butterfly valve has found widespread application due to its simplicity, dependability and economy of construction. Another advantage of the butterfly type valve is that it provides good throttling characteristics. Typically, the butterfly valve consists of a body having a flow passageway therethrough and a relatively flat circular disc mounted in the flow passageway. When the disc is rotated to the position where it is substantially perpendicular to the axis of the flow passageway opening, the opening is closed preventing fluid flow therethrough. To move the disc to fully opened position requires rotation of the disc only 90°. Between fully opened and fully closed positions, the valve can be used for throttling purposes. One difficulty with the use of butterfly type valves for throttling is that, in some applications, relatively high torques are applied to the stem by dynamic forces acting on the disc. It is therefore, important, especially when a valve is to be adapted to be utilized for throttling purposes, that a dependable handle mechanism be provided to afford means of rotating the disc from one position to another and to maintain the valve in set positions.

It is therefore an object of this invention to provide a handle for positioning a rotatable shaft.

More particularly, an object of this invention is to provide a handle for positioning a stem of a butterfly valve.

Still more particularly, the object of this invention is to provide a handle for positioning a butterfly valve which:

(a) Is simply and economically constructed;
(b) Is dependable;
(c) Is simple to use (that is, a handle which is easily moved from one position to another but wherein it dependably remains in the set position);
(d) Automatically locks in the position in which the handle is left as it is moved from one position to another;
(e) Is so arranged that the weight of the handle extension serves to lock the handle in the preselected position and at the same time wherein a spring applies resilient force to retain the handle in the preselected position; and
(f) Cannot be inadvertently left in an unlocked position.

The invention is defined in the appended claims. An exemplary embodiment of the handle of this invention is fully set forth in the following description taken in conjunction with the attached drawings in which:

This invention may be described as a handle for a valve. More particularly, but not by way of limitation, the invention may be described as a handle for use with a valve having a rotatable stem extending therefrom, the handle being used for rotatably positioning the stem, the handle comprising a bracket plate affixed to the exterior of the valve adjacent the stem, the bracket plate having a multiplicity of integral spaced tooth projections lying in a plane substantially perpendicular the axis of the stem, the tooth projections being equidistant from the stem, a pivot block having an opening therein receiving the stem, the pivot block being affixed to the stem adjacent the bracket plate, a handle housing having a recess in the lower side encompassing the pivot block, the handle housing pivotally supported to the pivot block, the handle housing having an integral extending tooth projection normally engaging the tooth projections of the bracket plate and disengageable from the bracket plate tooth projections when the handle housing is pivoted, an elongated handle extension affixed at the end of the housing adjacent the said tooth projection, the handle extension extending normally substantially perpendicularly of the stem, the weight of the handle extension urging the tooth projection of the handle housing into engagement with tooth projections of the bracket plate.

Figure 1:
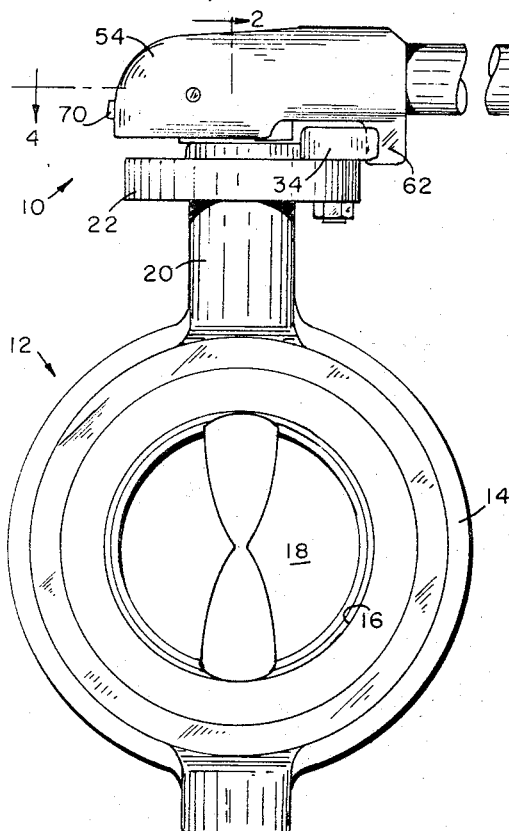
FIGURE 1 is an end view of a butterfly valve having the handle of this invention.
Figure 2:
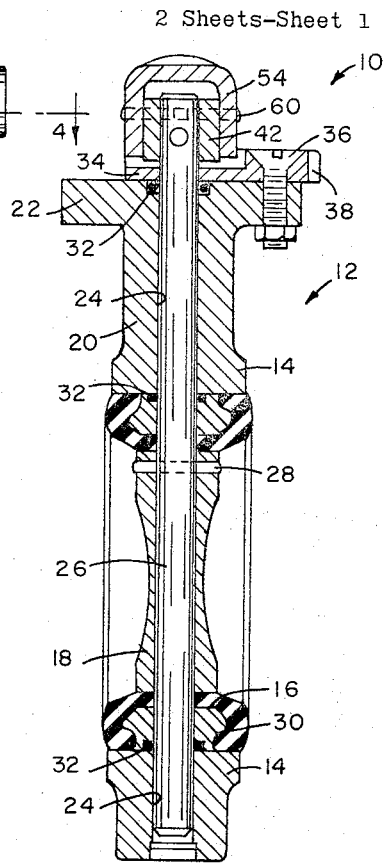
FIGURE 2 is a cross-sectional view taken along the line 2—2 of FIGURE 1.
Figure 3:
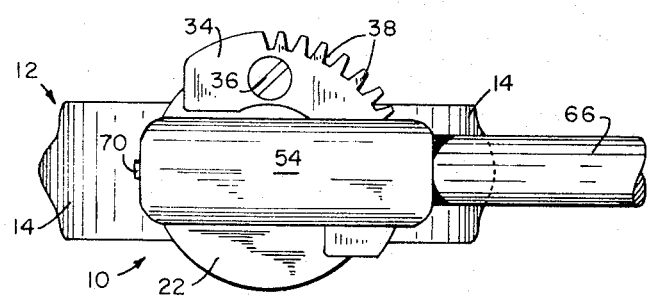
FIGURE 3 is a top view of a valve having the handle of this invention.

Referring now to the drawings, and first to FIGURES 1, 2 and 3, the handle of this invention, indicated generally by the numeral 10, is affixed to a valve, generally indicated by the numeral 12. The handle of this invention will be described as it is particularly adapted for use with a butterfly valve, however, it is understood that in its broadest applications the invention may be applied to rotatably positioning a shaft for any purpose. The handle is particularly adaptable to butterfly valves due to the unique requirement of the type of mechanism needed for positioning the stem of butterfly valves, and in its more limited sense, the invention can be said to comprise the combination of a butterfly valve and the unique handle of this invention.

The valve 12 consists basically of a body 14 having a flow passageway 16 therethrough. Rotatably supported in the flow passageway 16 is a valve disc 18. The disc 18 is shown in the position wherein it is substantially perpendicular to the axis of flow passageway 16, closing the valve. Integrally affixed to and extending from the body 14 is a stem neck portion 20 terminating in an integral flange 22. As best shown in FIGURE 2, a stem opening 24 is provided in the body 14 and neck portion 20; the stem opening is perpendicular to the axis of the flow passageway 16. Rotatably positioned in stem opening 24 is a cylindrical stem 26. The disc 18 is affixed to stem 26 such as by means of pin 28. The stem 26 extends upwardly beyond the flange 20 and it is by means of the externally extending portion of the stem 26 that the rotatable position of disc 18 is controlled.

The flow passageway 16 may be defined by a resilient seat 30 against which the periphery of disc 18 seals when the disc is in closed position to prevent fluid flow through the valve. O-rings 32 are typically provided to seal stem 26 and prevent leakage of fluid or gases carried by the valve.

The description of the valve 12 to this point is that of a more or less typical butterfly valve. This invention is concerned not with the construction features of the valve but with the handle means for rotatably positioning stem 26 so that the disc 18 may be maintained in a closed, opened, or a multiplicity of intermediate throttling positions.

Figure 4:
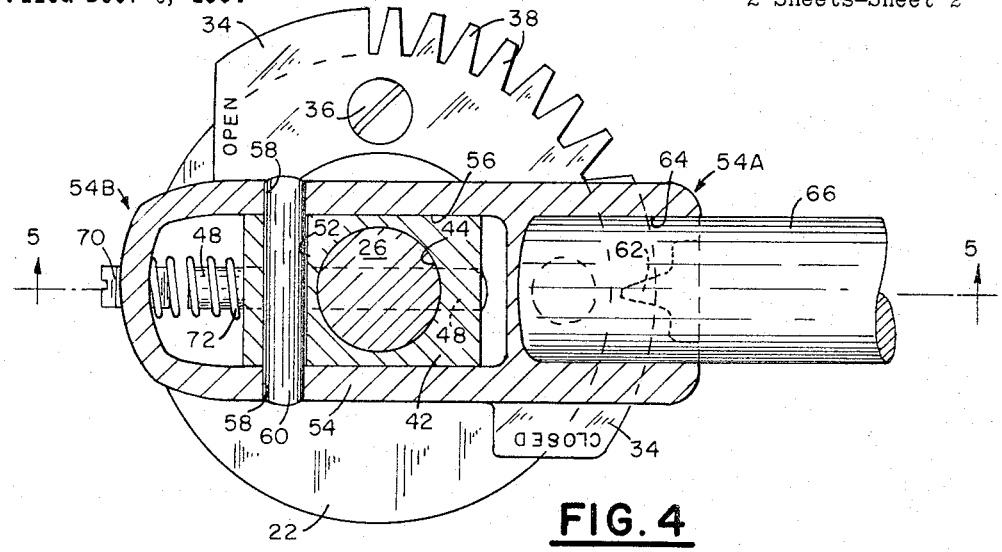
FIGURE 4 is an enlarged cross-sectional view taken along the line 4—4 of FIGURE 1, the valve not being shown.
Figure 5:
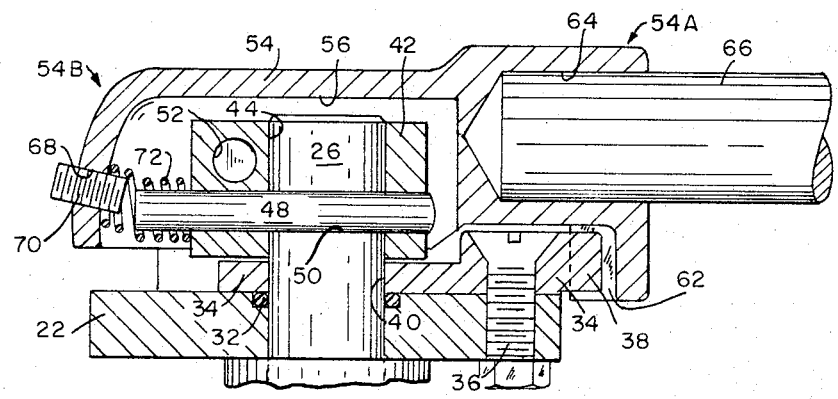
FIGURE 5 is a cross-sectional view taken along the line 5—5 of FIGURE 4 showing only the handle portion.
Figure 6:
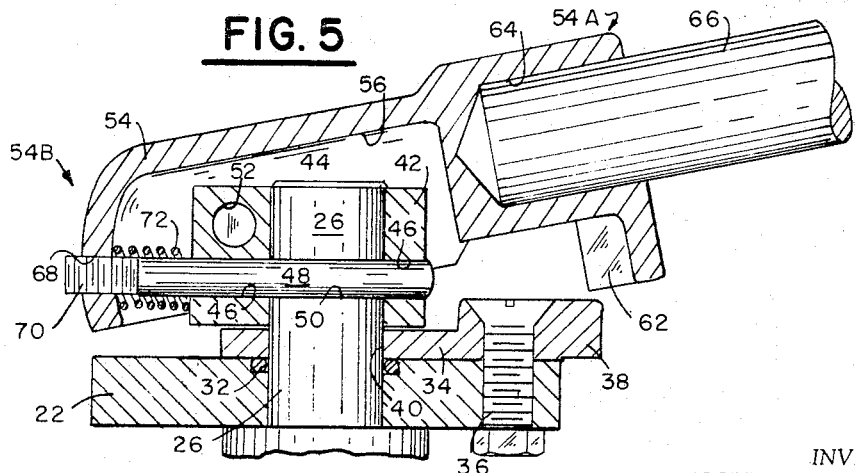
FIGURE 6 is a cross-sectional view as shown in FIGURE 5 but showing the handle tilted so that the valve stem can be moved from one position to another.

The handle of this invention is best understood by referring to FIGURES 4, 5, and 6. Affixed to the upper surface of flange 22 is a bracket plate 34 held by screws 36. The bracket plate includes a multiplicity of integral spaced tooth projections 38 lying in a plane substantially perpendicular the axis of stem 26 and equidistant from the stem. It can be seen that the bracket plate 34 may be affixed in many other ways directly to the valve body without the necessity of the body having a specific flange 22. The disclosed embodiment wherein the valve body is provided with flange 22 is, however, the preferred embodiment. The bracket plate 34 is preferably configured to have an opening 40 therein which rotatably receives stem 26. In this arrangement, the bracket plate 34 supplementary serves to retain O-ring 32 in position.

A pivot block 42 is provided having a first opening 44 by which the stem 26 is received and a second opening 46 by which a pin 48 is received. The stem 26 has an opening 50 aligned with opening 46 in a pivot block for receiving pin 48 whereby the pivot block 42 is secured to the stem 26. The pivot block 42 has a third opening 52 to receive a pin for a purpose to be described subsequently.

A main element of the invention is a handle housing 54 of a relatively rectangular cross-sectional configuration having a recess 56 in the lower side, the recess 56 substantially encompassing the pivot block 42. The handle housing 54 has openings 58 (see FIGURE 4) diametric its length aligned with openings 52 in the pivot block 42, the aligned openings 52 and 58 receiving a hinge pin 60 by which the handle member 54 is pivotally secured to the pivot block 42. By this arrangement the handle housing 54 is fixedly secured through pin 60 and pivot block 42 to stem 26 in a plane perpendicular the axis of the stem but is pivotal in one plane of the stem axis.

As best shown in FIGURES 5 and 6, the handle housing 54 has an integral extending tooth projection 62 which normally engages the tooth projections 38 of the bracket plate 34. Though a single tooth projection 62 is shown, it can be seen that more than one of such tooth projections 62 may be provided to engage, when the handle housing 54 is pivoted downwardly, the tooth projections 38 of bracket plate 34.

In the rearward end (indicated by the numeral 54A) of housing 54, there is provided an opening 64 receiving a handle extension 66 which may be of any length desired.

In the forward end of the handle housing 54, designated generally by the numeral 54B, there is a threaded opening 68 which receives a threaded stud 70. The stud 70 is in substantial alignment with pin 48, the forward end of which extends beyond the pivot block 42, the stud 70 and pin 48 terminating adjacent each other. In the preferred arrangement as shown in FIGURE 5, the stud 70 is slightly upwardly of and inclined at an angle of approximately 10° to the pin 48. As shown in FIGURE 6, the stud 70 may be threadably positioned so that when handle housing 54 is pivoted to permit tooth projection 62 to clear the bracket tooth projections 38, the stud 70 engages pin 48 to limit the upper pivotation of housing 54.

Encompassing both the stud 70 and the outward extending portion of pin 48 is a spring 72 applying compression force between the pivot block 42 and the interior forward portion of handle housing 54. The function of spring 72 is to urge the rearward end 54A of handle housing 54 downwardly to secure the engagement of tooth projection 62 with the bracket tooth projections 38.

*Operation*

FIGURE 5 best shows the handle of this invention in the usual or rest position. Whether the valve is opened, closed or in any intermediate position, tooth projection 62 engages the tooth projections 38 of the bracket plate 34 and prevents the rotational movement of stem 26. It can be seen that two forces operate to maintain the handle in this locked position. First, the handle is so arranged that the weight of extension 66 is applied directly to assure continuous engagement of the tooth projections 38 and 62. In addition, spring 72 serves to insure the continuous engagement of the tooth projections to prevent the rotational movement of valve stem 26.

When an operator desires to change the attitude of the valve he merely raises handle extension 66, pivoting the handle housing 54 to the attitude shown in FIGURE 6. This clears the tooth projection 62 from the bracket tooth projections 38. The operator can then rotate the handle and thereby stem 26 to the next desired position. Whether the next preselected position is open, closed or some intermediate throttling position, all the operator does is release his upward force on a handle extension 66 to return the handle to a locked position. The handle is always in locked position and cannot be inadvertently left in any unlocked position.

The handle of this invention is simple in construction. The operation of the handle is extremely elementary requiring only a few degrees of pivotation before rotational movement is applied. The primary advantage, however, of the invention is that under no circumstances can the valve be left in any unlocked position.

While the invention has been described with a certain degree of particularity, it is manifest that many changes may be made in the details of construction and arrangement of components without departing from the spirit and scope of this disclosure.

What is claimed:
1. For use with a valve having a rotatable stem extending therefrom, a handle for rotatably positioning the stem comprising:
   a bracket plate affixed to the exterior of the valve adjacent the stem, the bracket plate having a multiplicity of integral spaced tooth projections lying in a plane substantially perpendicular the axis of the stem, the tooth projections being equidistant from the stem;
   a pivot block having an opening therein receiving the stem, the pivot block being affixed to the stem adjacent the bracket plate and having a spring receiving post extending therefrom substantially perpendicular the stem;
   a handle housing having a forward and rearward end and a recess in the lower side encompassing the pivot block, the handle housing pivotally supported to the pivot block, the handle housing having an intergal extending tooth projection at the rearward end normally engaging the tooth projections of the bracket plate and disengageable from the bracket plate tooth projections when the handle housing is pivoted, the handle housing having a threaded opening in the forward end thereof in substantial alignment with the spring receiving post of the pivot block;
   a stud threadably positioned in said opening in the forward end of said housing;
   a coiled spring compressibly positioned between the interior forward end of said housing and said pivot block, the spring receiving at one end the post extending from the pivot block and at the other end the stud whereby the spring is retained in position, the spring serving to urge the rearward end of the handle housing pivotally towards the bracket plate; and
   an elongated handle extension affixed at one end to the rearward end of the housing, the handle extension extending normally substantially perpendicular to the stem.

2. A valve comprising:
   a body having a flow passageway therethrough and a stem opening intersecting the flow passageway;
   a disc member pivotally supported in the body in the flow passageway adaptable, when pivoted in one direction, to close the flow passageway and, when pivoted in the opposite direction, to open the flow passageway;
   a stem rotatably and sealably positioned in the body stem opening, the lower end of the stem being affixed to the disc member for rotatably positioning the disc member and the upper end of the stem terminating exteriorly of the body;

a bracket plate affixed to the exterior of the valve adjacent the stem, the bracket plate having a multiplicity of integral spaced tooth projections lying in a plane substantially perpendicular the axis of the stem, the tooth projections being equidistant from the stem;

a pivot block having an opening therein receiving the stem, the pivot block being affixed to the stem adjacent the bracket plate and having a spring receiving post extending therefrom substantially perpendicular the stem;

a handle housing having a forward and rearward end and a recess in the lower side encompassing the pivot block, the handle housing pivotally supported to the pivot block, the handle housing having an integral extending tooth projection at the rearward end normally engaging the tooth projections of the bracket plate and disengageable from the bracket plate tooth projections when the handle housing is pivoted, the handle housing having a threaded opening in the forward end thereof in substantial alignment with the spring receiving post of the pivot block;

a stud threadably positioned in said opening in the forward end of said housing;

a coiled spring compressibly positioned between the interior forward end of said housing and said pivot block, the spring receiving at one end the post extending from the pivot block and at the other end the stud whereby the spring is retained in position, the spring serving to urge the rearward end of the handle housing pivotally towards the bracket plate; and an elongated handle extension affixed at one end to the housing at the rearward end thereof, the handle extension extending normally substantially perpendicularly of the stem.

3. For use with a valve having a rotatable stem extending therefrom, a handle for rotatably positioning the stem comprising:

a bracket plate affixed to the exterior of the valve adjacent the stem, the bracket plate having a multiplicity of integral spaced tooth projections lying in a plane substantially perpendicular the axis of the stem, the tooth projections being equidistant from the stem;

a pivot block having an opening therein receiving the stem, the pivot block being affixed to the stem adjacent the bracket plate and having a spring receiving post extending therefrom substantially perpendicular the stem;

a handle housing having a forward and rearward end and a recess in the lower side encompassing the pivot block, the handle housing pivotally supported to the pivot block, the handle housing having an integral extending tooth projection at the rearward end normally engaging the tooth projections of the bracket plate and disengageable from the bracket plate tooth projections when the handle housing is pivoted;

a stud member affixed to and extending from the interior forward end of said handle housing in substantial alignment with said spring receiving post of the pivot block;

a coiled spring compressibly positioned between the interior forward end of said housing and said pivot block, the spring receiving at one end the post extending from the pivot block and at the other end the stud member whereby the spring is retained in position, the spring serving to urge the rearward end of the handle housing pivotally towards the bracket plate; and an elongated handle extension affixed at one end to the rearward end of the housing, the handle extension extending normally substantially perpendicular to the stem.

4. A valve comprising:

a body having a flow passageway therethrough and a stem opening intersecting the flow passageway;

a disc member pivotally supported in the body in the flow passageway adaptable, when pivoted in one direction, to close the flow passageway and, when pivoted in the opposite direction, to open the flow passageway;

a stem rotatably and sealably positioned in the body stem opening, the lower end of the stem being affixed to the disc member for rotatably positioning the disc member and the upper end of the stem terminating exteriorly of the body;

a bracket plate affixed to the exterior of the valve adjacent the stem, the bracket plate having a multiplicity of integral spaced tooth projections lying in a plane substantially perpendicular the axis of the stem, the tooth projections being equidistant from the stem;

a pivot block having an opening therein receiving the stem, the pivot block being affixed to the stem adjacent the bracket plate and having a spring receiving post extending therefrom substantially perpendicular the stem;

a handle housing having a forward and rearward end and a recess in the lower side encompassing the pivot block, the handle housing pivotally supported to the pivot block, the handle housing having an integral extending tooth projection at the rearward end normally engaging the tooth projections of the bracket plate and disengageable from the bracket plate projections when the handle housing is pivoted;

a stud member affixed to and extending from the interior forward end of said handle housing in substantial alignment with said spring receiving post of the pivot block;

a coiled spring compressibly positioned between the interior forward end of said housing and said pivot block, the spring receiving at one end the post extending from the pivot block and at the other end said stud member whereby the spring is retained in position, the spring serving to urge the rearward end of the handle housing pivotally towards the bracket plate; and an elongated handle extension affixed at one end to the housing at the rearward end thereof, the handle extension extending normally substantially perpendicularly of the stem.

References Cited

UNITED STATES PATENTS

| | | | |
|---|---|---|---|
| 1,351,391 | 8/1920 | McGahey | 251—98 |
| 1,671,594 | 5/1928 | Kohlmann | 251—90 |
| 2,536,199 | 1/1951 | McDonald | 251—98 X |
| 2,565,244 | 8/1951 | Laurent | 251—107 |
| 2,939,674 | 6/1960 | Anderson | 251—99 X |

M. CARY NELSON, *Primary Examiner.*

R. C. MILLER, *Assistant Examiner.*